April 23, 1968 C. L. METEER 3,378,884
APPARATUS FOR MAKING FIBER REINFORCED RESIN
ARTICLES ESPECIALLY IN SHEET FORM
Filed Feb. 25, 1965 2 Sheets-Sheet 1
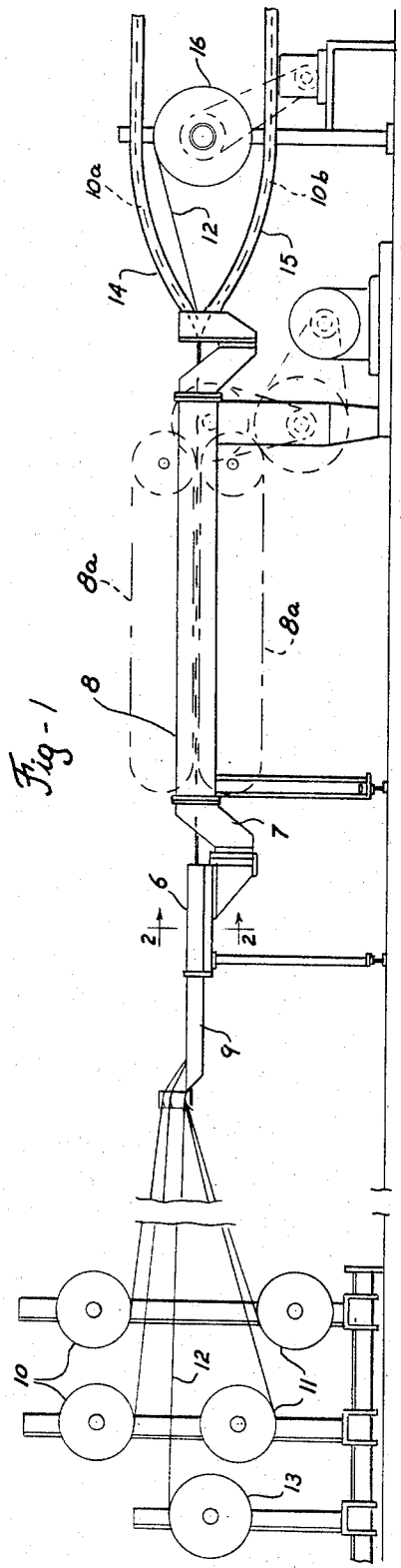
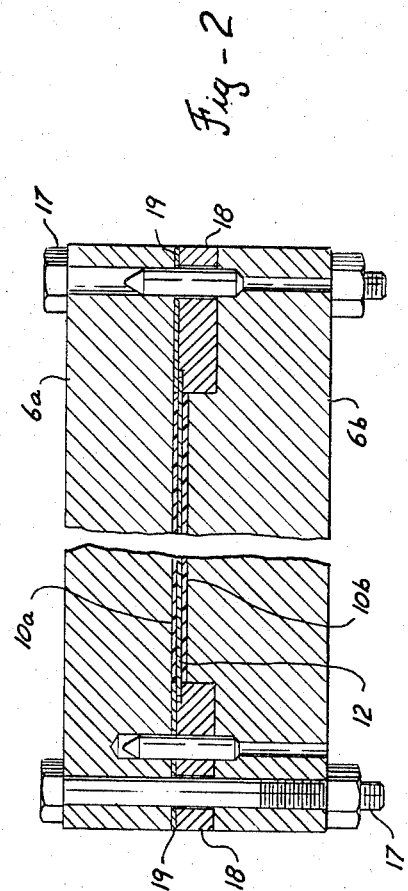
INVENTOR.
Charles L. Meteer
BY
Synnestvedt & Lechner
ATTORNEYS

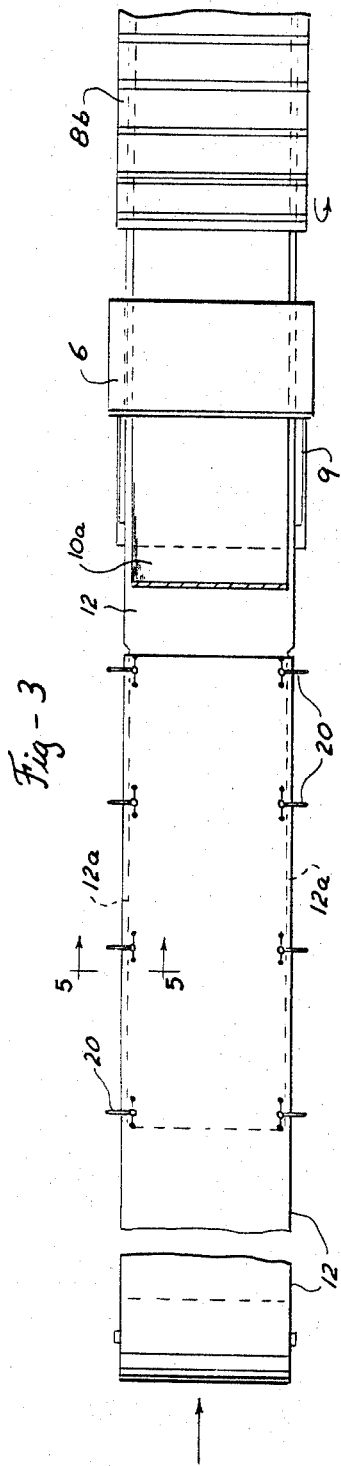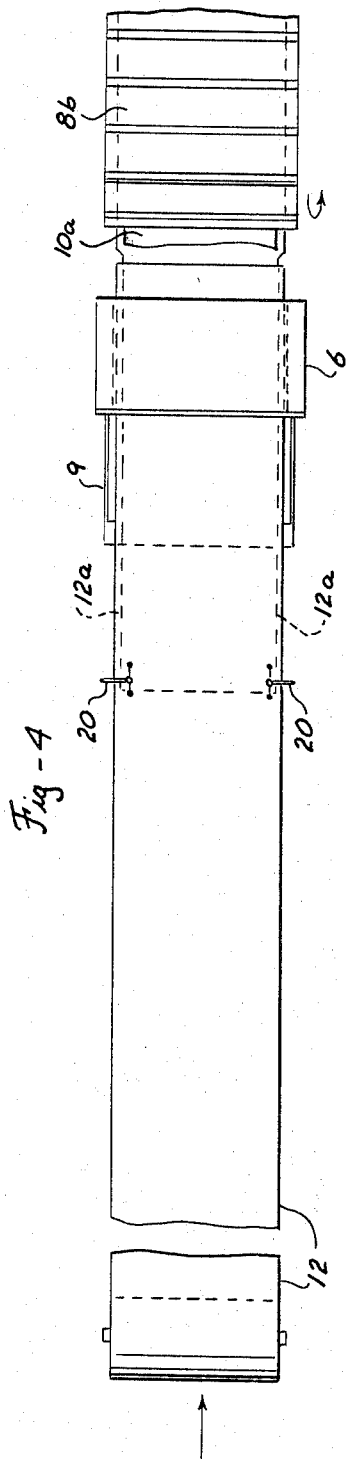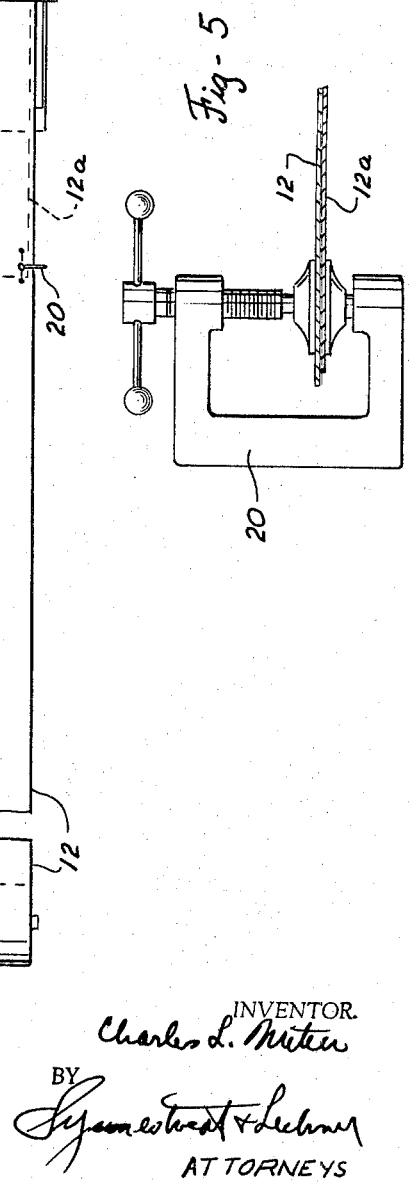

United States Patent Office 3,378,884
Patented Apr. 23, 1968

3,378,884
APPARATUS FOR MAKING FIBER REINFORCED RESIN ARTICLES ESPECIALLY IN SHEET FORM
Charles L. Meteer, Bristol, Tenn., assignor, by mesne assignments, to Koppers Company, Inc., Pittsburgh, Pa., a corporation of Delaware
Filed Feb. 25, 1965, Ser. No. 435,193
7 Claims. (Cl. 18—4)

This invention relates to the production of fiber reinforced resin articles and is particularly concerned with a technique for producing such articles by the employment of a forming device having a forming passage therein through which the reinforcement and resin material are passed along with one or more travelling strips or cores, the resin material being introduced into the forming passage in liquid form and being heated in the forming passages to thereby produce one or more solidified articles.

A system of the general kind referred to just above is disclosed in the copending application Ser. No. 243,862, now Patent No. 3,291,878 filed Dec. 11, 1962, and assigned to the assignee of the present application. In that application there is disclosed a system in which fibrous reinforcements are impregnated with a liquid heat hardenable resin material, for instance the well known polyester type of resin material employed for laminating purposes, and the impregnated reinforcement is fed along with a metal strip into the entrance end of the forming passage, the strip being of width corresponding to that of the reinforcements and also to the width of the forming passage. The resin material is heated in the forming passage to solidify the article or articles therein and a puller mechanism is arranged beyond the exit end of the forming passage so as to grip and pull the sandwich of materials delivered from the forming passage and thereby advance all of the materials through the system.

The present invention is particularly concerned with certain improvements in equipment of the kind referred to just above, in order to overcome certain problems which have been encountered. One such problem encountered arose from the fact that the metal strip at times displayed a tendency to creep toward one edge or the other of the forming passage and mar or score the side wall of the passage to such an extent that the forming device was damaged with consequent production of articles having ragged, rather than sharply defined edges.

With the foregoing in mind, the arrangement of the present invention contemplates the employment of a forming device in which the edge walls of the forming passage are notched out or recessed and in which the travelling strip or core is made of width greater than the width of the forming passage, the edges of the strip being received in the notches. In this way the integrity of the articles being made is maintained and the die cavity itself which shapes and forms the articles is not damaged in use.

How the foregoing and other objects and advantages are attained will appear more fully from the following description referring to the accompanying drawings in which:

FIGURE 1 is an overall elevational side view partly in outline and partly shown diagrammatically, illustrating a preferred embodiment of the invention in which separate reinforcements for forming two articles are fed into the forming device at opposite sides of a single travelling strip;

FIGURE 2 is a transverse sectional view through the forming device of FIGURE 1, the view being taken as indicated by the section line 2—2 on FIGURE 1 and being on an enlarged scale;

FIGURE 3 is a top plan view of certain portions of the arrangement of FIGURE 1, illustrating the plan configuration of a travelling strip constructed in accordance with the invention and further illustrating the use of clamps for connecting one travelling strip to another as they are fed sequentially through the apparatus;

FIGURE 4 is a plan view similar to FIGURE 3 but illustrating a different position of certain parts; and FIGURE 5 is an enlarged detail view taken as substantially indicated by the line 5—5 on FIGURE 3.

Turning first to FIGURE 1, the forming device is indicated at 6, this device being mounted on a bracket 7 extended from the main frame 8 of a crawler type puller mechanism, for instance of the kind disclosed in Patent No. 3,151,354, issued Oct. 6, 1964, and incorporating a pair of crawler treads 8a.

At the entrance end of the forming device a resin pan 9 is mounted, being provided for the purpose of enabling impregnation of various fibrous reinforcement webs being fed to the equipment, there being here shown two supply reels 10 to make up the reinforcement for one article being formed and two supply reels 11 to make up the reinforcement for another article being formed. These reinforcements are fed along with the metal travelling core or strip 12 which is supplied from the reel 13, the reinforcements and strip being passed through the resin pan 9 and the reinforcements being thereby impregnated with the liquid heat hardenable resin material in the resin pan. The reinforcements and the travelling strip are then brought together in the form of a sandwich and fed into and through a forming passage in the forming device 6 in which the resin material is heated, for instance in the manner referred to in the copending application 243,862, referred to above. The heating is sufficient to solidify the resin of the articles being formed and the sandwich of solidified articles and strip 12 are delivered from the discharge end of the forming device, being received between the gripping blocks of the crawler treads 8a—8a, and being gripped thereby so as to draw the materials through the system and to deliver the sandwich toward the right as viewed in FIGURE 1.

Beyond the delivery end of the puller mechanism a pair of diverging guides 14 and 15 serve to separate the two solidified articles from the intervening strip 12 and the strip 12 is wound upon a reel 16. The solidified articles may be delivered continuously from the guides 14 or may be cut off at intervals as desired.

In FIGURE 2 there is shown upper and lower parts 6a and 6b of the forming device, these parts being clamped together by means of bolts 17 with blocks 18 therebetween and, if desired, with spacers or shims 19 by means of which the thickness of the piece being made may be varied, by substitution of shims of various thickness. The shims and blocks 18–19 at each side of the forming device cooperate to define grooves or notches in the edges of the forming device in which the edge portions of the travelling strip 12 are received.

From FIGURE 2 it will further be noted that in the present instance the articles being made are of simple sheet form, the upper one being indicated at 10a in FIGURE 2 and the lower one at 10b, the strip 12 being disposed between the two articles.

It should be understood that articles of a variety of forms may be made in accordance with the invention and while a travelling strip may be arranged at one side of the forming passage with only a single reinforcement toward the other side, in most instances it is preferred to concurrently produce a plurality of pieces, as is disclosed in the embodiment illustrated in the drawings.

In accordance with another aspect of the arrangement of this invention, the travelling strip employed is desirably reduced in width toward one end thereof, for instance toward the trailing end, and such reduction in width is indicated by the dotted lines 12a in FIGURES 3 and 4. Preferably the dimension in the portion of reduced width is not greater than the width of the die itself, and preferably somewhat less. When the trailing end portion of one travelling strip approaches the resin pan, in order to maintain the production of the articles without interruption, another strip 12, which may be of the same form, is brought into position with its leading end portion overlapping the trailing end portion 12a of the first strip, and the two strips are clamped together, for instance by means of simple C-clamps indictated at 20. By clamping the two strips together, the feed of the second strip may be started through the equipment in its proper relation to the first strip. When the leading end portion of the second strip reaches the forming device, only a single thickness of metal will be present to enter the notches at the edges of the forming passage, because of the fact that the trailing end portion of the first strip has been cut away as indicated at 12a. It will be understood that as the overlapped portions of the two strips enter the resin pan and the die, the pairs of clamps will be sequentially removed, so that the clamps will of course not enter the resin pan or will not interfere with passage of the strip through the forming device. However, it is preferred that the lengthwise dimension of the overlapping of the two strips, and also the lengthwise dimension of the portion of the first strip which is of reduced width, be sufficient to provide for entrance of the leading end of the second strip into the puller mechanism, to be engaged by the gripping elements or blocks 8b thereof, before the time when the trailing end of the first strip enters the resin pan. In FIGURE 4 the parts are shown in the position just mentioned (prior to entrance of the leading end of the second strip into the puller mechanism) and in this position it will be noted that there still remains one pair of the clamps 20 interconnecting the leading end portion of the second strip with the trailing end portion of the first strip. These clamps are preferably retained until the leading end of the second strip is engaged by the puller blocks 8b, at which time the remaining clamps 20 are removed. In this way slippage of one strip with respect to another is avoided, the clamping action of the gripping blocks 8b of the puller mechanism serving to grip the sandwich of materials being delivered from the forming device and thereby provide for advancement thereof as a unit.

The foregoing arrangement of the travelling strip with one end narrower than the other end is also of advantage in enabling use of grooves or notches in the edges of the die which are only large enough to accept one thickness of the travelling strip. It is preferred that the grooves rather closely fit the edges of the travelling strip in order to eliminate flash and other irregularities at the edges of the articles being made.

The arrangement for overlapping and securing the leading edge of one sheet to the trailing edge of another may also be employed with a single travelling strip, where the length thereof is sufficient to permit the leading end thereof to be brought around and reintroduced into the system prior to the discharge of the trailing end of the sheet from the apparatus. Thus the invention is applicable to the employment of only a single travelling strip or to several of such strips.

Advantageously the strip 12 takes the form of a metallic strip, for instance a stainless steel strip which presents a smooth surface from which the solidified articles may readily be separated after delivery from the puller mechanism.

Although the invention is applicable to the employment of resin and reinforcement materials of a variety of types, it is especially suited to the employment of heat hardenable liquid resin materials such as those mentioned above, and to fibrous reinforcements, especially glass fiber reinforcements.

The equipment and technique described above is especially adapted to the production of articles in sheet form, and has special utility also where the sheets being made are relatively thin, as is frequently desired. The production of several such sheets at once, especially with a travelling strip therebetween, greatly reduces tendency for breakage of the articles with consequent shutdowns; and the arrangement of the die with notches to acecpt the edges of the travelling strip avoids damage to the edge walls of the forming passage and provides for production of articles with uniform and well defined edges.

I claim:

1. Apparatus for concurrently making a plurality of fiber reinforced resin sheets comprising a forming device having a forming passage extended therethrough of width conforming with the width of the sheets to be made and of sufficient size to accommodate a plurality of sheets positioned face-to-face, mechanism for feeding a plurality of separate fiber reinforcements to the forming passage along with a separator strip positioned between the separate reinforcements in the manner of a sandwich, means for impregnating the reinforcements with a liquid heat hardenable resin material, the separator strip being of width greater than that of the forming passage and of the sheets being made and the edge portions of the forming device being provided with grooves in which the edges of the separator strip are received, means for heating and thereby solidifying the resin material as the impregnated reinforcements move through the forming passage, and puller mechanism having gripping elements adapted to engage and pull on the sandwich of separator strip and solidified sheets beyond the discharge end of the forming passage.

2. Apparatus according to claim 1 in which the separator strip has end portions one of which is narrower than the other end portion and is adapted to be overlapped with the other end portion, the narrower end portion having a width not greater than that of the forming passage so as to provide only a single thickness of separator strip in the grooves in the edge portions of the forming device.

3. Apparatus according to claim 2 in which the trailing end of the strip is narrower than the leading end.

4. Apparatus according to claim 2 in which the length of the narrower end portion of the separator strip is greater than the distance from the entrance of the forming passage through the forming passage to the gripping elements of the puller mechanism.

5. Apparatus for use in making a fiber reinforced resin article comprising a forming device having a forming passage extended therethrough, mechanism for feeding a fiber reinforcement to the forming passage along with a travelling strip, the reinforcement and strip being in face-to-face relation and the strip being of greater width than that of the forming passage in the plane in which the strip is fed to the forming passage, and the portions of the forming device adjacent the edges of the strip having grooves receiving the edge portions of the strip, means for impregnating the fiber reinforcement with a heat hardenable liquid resin material, means for heating and thereby solidifying the resin material as the impregnated reinforcement moves through the forming passage, and puller mechanism engaging the strip and solidified article beyond the discharge end of the forming passage for advancing the materials through the apparatus.

6. Apparatus according to claim 5 and further including mechanism for feeding at least two separate reinforcements along with the travelling strip, with one reinforcement at each side of the strip.

7. Apparatus according to claim 5 in which the grooves in the forming device closely approximate the thickness of the travelling strip thereby minimizing formation of flash at the edges of the article being made.

No references cited.

DOUGLAS J. DRUMMOND, *Primary Examiner.*